(12) United States Patent
Sethi et al.

(10) Patent No.: US 7,376,830 B2
(45) Date of Patent: May 20, 2008

(54) SYSTEM AND METHOD FOR ROUTING MESSAGES

(75) Inventors: Vincent Sethi, Chandlers Ford (GB); Joseph A. Vaskas, Bethpage, NY (US); Thomas J. Connelly, Wantagh, NY (US); Rosemarie Wos, Chatham, NJ (US); Athena Barlow, Jersey City, NJ (US); Marina Shabash, North Plainfield, NJ (US); Chandramouli X. Narayanan, Edgewater, NJ (US)

(73) Assignee: JP Morgan Chase Bank, New York, NY (US)

( * ) Notice: Subject to any disclaimer, the term of this patent is extended or adjusted under 35 U.S.C. 154(b) by 442 days.

(21) Appl. No.: 11/113,752

(22) Filed: Apr. 25, 2005

(65) Prior Publication Data

US 2006/0031586 A1    Feb. 9, 2006

Related U.S. Application Data

(60) Provisional application No. 60/565,490, filed on Apr. 26, 2004.

(51) Int. Cl.
*H04L 29/00* (2006.01)
(52) U.S. Cl. .................. 713/153; 726/12; 726/14; 709/238; 709/240; 709/246; 370/351
(58) Field of Classification Search ............... 713/153; 726/12, 14; 709/238, 240, 246; 370/351
See application file for complete search history.

(56) References Cited

U.S. PATENT DOCUMENTS

| 4,751,702 A | 6/1988 | Beier et al. |
| 5,027,269 A | 6/1991 | Grant et al. |
| 5,301,320 A | 4/1994 | McAtee et al. |
| 5,325,527 A | 6/1994 | Cwikowski et al. |
| 5,339,434 A * | 8/1994 | Rusis .................. 709/246 |
| 5,499,371 A | 3/1996 | Henninger et al. |
| 5,539,885 A | 7/1996 | Ono et al. |

(Continued)

FOREIGN PATENT DOCUMENTS

WO        01/35209        5/2001

(Continued)

OTHER PUBLICATIONS

Thomas; Enterprise Javabeans(TM) Technology: Server Component Model for the Java(TM) Platform, JAVA.SUN.COM, May 2, 1999.

(Continued)

*Primary Examiner*—Kambiz Zand
*Assistant Examiner*—Tongoc Tran
(74) *Attorney, Agent, or Firm*—Lowenstein Sandler PC

(57) ABSTRACT

A hub-and-spoke communication arrangement is provided, in which the "hub" includes a server computer system. The "spokes" are other computers that act as message originators and/or destinations. All internal-to-external messages, and vice versa, are routed through the server computer system to reduce the number of proprietary connections needed between the internal and external entities. In addition, the server computer system provides protocol conversion, message payload conversion, encryption conversion, message broadcast, and/or message archival functionality, so that the "spoke" computers need not be concerned with providing such functionality on their own.

15 Claims, 5 Drawing Sheets

U.S. PATENT DOCUMENTS

| | | |
|---|---|---|
| 5,553,235 A | 9/1996 | Chen et al. |
| 5,566,297 A | 10/1996 | Devarakonda et al. |
| 5,594,863 A | 1/1997 | Stiles |
| 5,630,047 A | 5/1997 | Wang |
| 5,630,173 A | 5/1997 | Oprescu |
| 5,673,403 A | 9/1997 | Brown et al. |
| 5,689,698 A | 11/1997 | Jones et al. |
| 5,692,181 A | 11/1997 | Anand et al. |
| 5,712,971 A | 1/1998 | Stanfill et al. |
| 5,717,925 A | 2/1998 | Harper et al. |
| 5,732,262 A | 3/1998 | Gillespie et al. |
| 5,734,887 A | 3/1998 | Kingberg et al. |
| 5,737,592 A | 4/1998 | Nguyen et al. |
| 5,761,499 A | 6/1998 | Sonderegger |
| 5,768,119 A | 6/1998 | Havekost et al. |
| 5,784,557 A | 7/1998 | Oprescu |
| 5,790,809 A * | 8/1998 | Holmes ............... 709/228 |
| 5,801,689 A | 9/1998 | Huntsman |
| 5,802,367 A | 9/1998 | Held et al. |
| 5,806,075 A | 9/1998 | Jain et al. |
| 5,815,415 A | 9/1998 | Bentley et al. |
| 5,845,292 A | 12/1998 | Bohannon et al. |
| 5,889,992 A | 3/1999 | Koerber |
| 5,899,990 A | 5/1999 | Maritzen et al. |
| 5,926,637 A | 7/1999 | Cline et al. |
| 5,930,768 A | 7/1999 | Hooban |
| 5,937,198 A | 8/1999 | Nelson et al. |
| 5,937,402 A | 8/1999 | Pandit |
| 5,946,458 A | 8/1999 | Austin et al. |
| 5,949,412 A | 9/1999 | Huntsman |
| 5,960,200 A | 9/1999 | Eager et al. |
| 5,960,445 A | 9/1999 | Tamori et al. |
| 5,987,247 A | 11/1999 | Lau |
| 5,999,179 A | 12/1999 | Kekic et al. |
| 6,003,075 A | 12/1999 | Arendt et al. |
| 6,009,274 A | 12/1999 | Fletcher et al. |
| 6,009,405 A | 12/1999 | Leymann et al. |
| 6,011,916 A | 1/2000 | Moore et al. |
| 6,041,123 A * | 3/2000 | Colvin, Sr. ............ 713/153 |
| 6,046,742 A | 4/2000 | Chari |
| 6,052,456 A | 4/2000 | Huang |
| 6,065,009 A | 5/2000 | Leymann et al. |
| 6,083,276 A | 7/2000 | Davidson et al. |
| 6,101,489 A | 8/2000 | Lannert et al. |
| 6,101,601 A | 8/2000 | Matthews et al. |
| 6,108,698 A | 8/2000 | Tenev et al. |
| 6,148,296 A | 11/2000 | Tabbara |
| 6,163,776 A | 12/2000 | Periwal |
| 6,173,439 B1 | 1/2001 | Carlson et al. |
| 6,178,409 B1 | 1/2001 | Weber et al. |
| 6,184,996 B1 | 2/2001 | Gase |
| 6,185,613 B1 | 2/2001 | Lawson et al. |
| 6,195,676 B1 | 2/2001 | Spix et al. |
| 6,226,684 B1 | 5/2001 | Sung et al. |
| 6,230,319 B1 | 5/2001 | Britt, Jr. et al. |
| 6,246,410 B1 | 6/2001 | Bergeron et al. |
| 6,249,877 B1 | 6/2001 | Kawakami et al. |
| 6,253,193 B1 | 6/2001 | Ginter et al. |
| 6,272,556 B1 | 8/2001 | Gish |
| 6,282,698 B1 | 8/2001 | Baker et al. |
| 6,288,790 B1 | 9/2001 | Yellepeddy et al. |
| 6,289,336 B1 | 9/2001 | Melton et al. |
| 6,292,933 B1 | 9/2001 | Bahrs et al. |
| 6,298,353 B1 | 10/2001 | Apte |
| 6,304,871 B1 | 10/2001 | Gajda et al. |
| 6,314,430 B1 | 11/2001 | Chang |
| 6,317,738 B1 | 11/2001 | Lohman et al. |
| 6,324,525 B1 | 11/2001 | Kramer et al. |
| 6,324,619 B1 | 11/2001 | Raverdy et al. |
| 6,332,161 B1 | 12/2001 | Sasson |
| 6,353,820 B1 | 3/2002 | Edwards et al. |
| 6,363,363 B1 | 3/2002 | Haller et al. |
| 6,363,499 B1 | 3/2002 | Delo et al. |
| 6,381,609 B1 | 4/2002 | Breitbart et al. |
| 6,430,556 B1 | 8/2002 | Goldberg et al. |
| 6,438,749 B1 | 8/2002 | Chamberlain |
| 6,442,533 B1 | 8/2002 | Hinkle |
| 6,442,748 B1 | 8/2002 | Bowman-Amuah |
| 6,453,127 B2 | 9/2002 | Wood et al. |
| 6,463,343 B1 | 10/2002 | Emens et al. |
| 6,463,439 B1 | 10/2002 | Dahlberg |
| 6,467,079 B1 | 10/2002 | Ettritch et al. |
| 6,470,384 B1 | 10/2002 | O'Brian et al. |
| 6,473,786 B1 | 10/2002 | Scouras et al. |
| 6,477,580 B1 | 11/2002 | Bowman-Amuah |
| 6,477,590 B1 | 11/2002 | Habusha et al. |
| 6,480,860 B1 | 11/2002 | Monday |
| 6,480,894 B1 | 11/2002 | Courts et al. |
| 6,484,310 B1 | 11/2002 | Przbylski et al. |
| 6,502,095 B2 | 12/2002 | Breitbart et al. |
| 6,502,207 B1 | 12/2002 | Itoh et al. |
| 6,505,238 B1 | 1/2003 | Tran |
| 6,510,352 B1 | 1/2003 | Badavas et al. |
| 6,518,983 B1 | 2/2003 | Grohmann et al. |
| 6,526,571 B1 | 2/2003 | Aizikowitz et al. |
| 6,539,337 B1 | 3/2003 | Provan et al. |
| 6,546,419 B1 | 4/2003 | Humpleman et al. |
| 6,553,428 B1 | 4/2003 | Ruehle et al. |
| 6,557,039 B1 | 4/2003 | Leong et al. |
| 6,571,282 B1 | 5/2003 | Bowman-Amuah |
| 6,571,389 B1 | 5/2003 | Spyker et al. |
| 6,578,068 B1 | 6/2003 | Bowman-Amuah |
| 6,584,497 B1 | 6/2003 | Case et al. |
| 6,590,587 B1 | 7/2003 | Wichelman et al. |
| 6,615,258 B1 | 9/2003 | Barry et al. |
| 6,643,679 B1 | 11/2003 | Erickson et al. |
| 6,654,784 B1 | 11/2003 | Wei |
| 6,657,625 B1 | 12/2003 | Chik et al. |
| 6,675,228 B1 | 1/2004 | Bahrs et al. |
| 6,725,231 B2 | 4/2004 | Hu et al. |
| 6,928,488 B1 | 8/2005 | de Jong et al. |
| 2001/0020255 A1 | 9/2001 | Hofmann et al. |
| 2001/0029604 A1 | 10/2001 | Dreyband et al. |
| 2002/0010867 A1 | 1/2002 | Schaefer et al. |
| 2002/0046239 A1 | 4/2002 | Stawikowski et al. |
| 2002/0055804 A1 | 5/2002 | Betawar et al. |
| 2002/0062440 A1* | 5/2002 | Akama ............... 713/171 |
| 2002/0062475 A1 | 5/2002 | Iborra et al. |
| 2002/0065814 A1 | 5/2002 | Okamoto et al. |
| 2002/0069156 A1 | 6/2002 | Adam et al. |
| 2002/0069192 A1 | 6/2002 | Aegerter |
| 2002/0078115 A1 | 6/2002 | Poff et al. |
| 2002/0103725 A1 | 8/2002 | Martin et al. |
| 2002/0103835 A1 | 8/2002 | Kearney |
| 2002/0109718 A1 | 8/2002 | Mansour et al. |
| 2002/0111995 A1 | 8/2002 | Mansour et al. |
| 2002/0111999 A1 | 8/2002 | Andersson |
| 2002/0116205 A1 | 8/2002 | Ankireddipally et al. |
| 2002/0120685 A1 | 8/2002 | Srivastava et al. |
| 2002/0124113 A1 | 9/2002 | Gargya et al. |
| 2002/0129096 A1 | 9/2002 | Mansour et al. |
| 2002/0133579 A1 | 9/2002 | Bernhardt et al. |
| 2002/0143721 A1 | 10/2002 | Charlet et al. |
| 2002/0143819 A1 | 10/2002 | Han et al. |
| 2002/0144101 A1 | 10/2002 | Wang et al. |
| 2002/0147857 A1 | 10/2002 | Sanchez II, et al. |
| 2002/0178191 A1 | 11/2002 | Sielken |
| 2002/0178434 A1 | 11/2002 | Fox et al. |
| 2002/0188765 A1 | 12/2002 | Fong et al. |
| 2002/0188928 A1 | 12/2002 | Szpak et al. |
| 2003/0009323 A1 | 1/2003 | Adeli |
| 2003/0028555 A1 | 2/2003 | Young et al. |
| 2003/0033121 A1 | 2/2003 | Chen et al. |
| 2003/0033159 A1 | 2/2003 | Altomare |

| | | | |
|---|---|---|---|
| 2003/0036809 | A1 | 2/2003 | Landman et al. |
| 2003/0046317 | A1 | 3/2003 | Cseri et al. |
| 2003/0050897 | A1 | 3/2003 | Altomare |
| 2003/0069907 | A1 | 4/2003 | Moreau et al. |
| 2003/0084067 | A1 | 5/2003 | Obiaya |
| 2003/0093574 | A1 | 5/2003 | Fablet et al. |
| 2003/0097383 | A1 | 5/2003 | Smirnov et al. |
| 2003/0160813 | A1 | 8/2003 | Raju |
| 2003/0217033 | A1 | 11/2003 | Sandler et al. |
| 2004/0107183 | A1 | 6/2004 | Mangan |
| 2004/0230587 | A1 | 11/2004 | Doddington |
| 2005/0030555 | A1 | 2/2005 | Phenix et al. |

FOREIGN PATENT DOCUMENTS

| | | |
|---|---|---|
| WO | 01/63529 | 8/2001 |
| WO | 02/46916 | 6/2002 |
| WO | 02/46980 | 6/2002 |
| WO | 03/001373 | 1/2003 |

OTHER PUBLICATIONS

Mcclanahan; Powerbuilder3.0, M&T Publishing Inc., vol. 6, No. 11, p. 57, ISSN. 1041-5173, Oct. 1993.

Unknown; Conjuring up Com Through Scripting, p. 14, Jul. 2000.

Myers; Scripting Graphical Applications By Demonstration, Human Computer Interaction Institute, Carnegie Mellon University, WWW.CS.CMU.EDU/BAM, p. 1-8, Apr. 1998.

Ousterhoust; Scripting Higher Level Programming for the 21st Century, Sun Microsystems Laboratories, Draft #2, p. 1-14, May 10, 1997.

Dolev, et al.; An Integrated Architecture for the Scalable Delivery of Semi-Dynamic Web Content, Proceedings of the Seventh International Symposium on Computers and Communications, IEEE, 2002.

Betwixt: Turning Beans Into XML, Apache Software Foundation, Archived Jun. 20, 2002 at <HTTP://WEB.ARCHIVE.ORG/WEB/20020620000410/HTTP://JAKARTA.APAHCE.ORG.COMMONS/BETWIXT/>, p. 1 of 1, Nov. 13, 2005.

XML Schema Part 0 Primer-W3C Working Draft, W3C, Feb. 2000, Retrieved From the Internet on Nov. 18, 2005 at <HTTP://WWW.W3.ORG/TR/2000/WD-XMLSCHEMA-0-20000225/>, 42 pages.

Frank M. Carrano, et al.; Frank M. Carrano, et al., Data Abstraction and Problem Solving With C++, Aug. 1998, Addison-Wesley, Chapter 2.

Brodkin; Brodkin, Use XML Data Binding to do Your Laundry, Retrieved From the Internet on May 19, 2006, Acessed and Printed From From the Internet on May 19, 2006 at HTTP://WWW.JAVAWORLD.COM/JAVAWORLD/JW-12-2001/JW-1228-JAXB.HTML.

* cited by examiner

SYSTEM AND METHOD FOR ROUTING MESSAGES

CROSS-REFERENCE TO RELATED APPLICATION

This application claims the benefit of U.S. Provisional Application No. 60/565,490, filed Apr. 26, 2004, the entire disclosure of which is hereby incorporated herein by reference.

FIELD OF THE INVENTION

The present invention relates to efficiently routing messages. In particular, this invention pertains to routing messages while handling protocol conversions, encryption conversions, message payload conversions, and archiving, so that message originators need not be concerned with the protocol, encryption method, and message payload format used by their destination(s).

BACKGROUND OF THE INVENTION

With reference to FIG. 1, organizations often are comprised of multiple lines of businesses ("LOBs") 101, 102, 103. Commonly, these LOBs need to transmit digital information to one or more external entities 104, for example, to conduct business. For instance, in the securities-trading industry, LOBs need to transmit information to the Depository Trust and Clearing Corporation (DTCC), an external entity, pertaining to the trades they have conducted for settlement of the trades. In many cases, communication between the LOBs 101, 102, 103 and an external entity 104 occurs over proprietary connections 105, such as leased lines. The LOBs 101, 102, 103 are charged a fee for using the proprietary connections 105.

In conventional arrangements, because the LOBs 101, 102, 103 often are unaware of what other LOBs are doing, each LOB 101, 102, 103 would establish its own proprietary connection 105 with the external entity 104. However, because fees are associated with each proprietary connection 105, such conventional arrangements are fiscally inefficient. Accordingly, a way to reduce the number of proprietary connections 105 is needed in the art.

SUMMARY OF THE INVENTION

This problem is addressed and a technical solution is achieved in the art by a system and a method for routing messages according to the present invention. In an embodiment of the present invention, a hub-and-spoke communication arrangement is provided, in which the "hub" includes a server computer system, and the "spokes" are other computers that act as message originators and/or destinations. All internal-to-external messages, and vice versa, are routed through the "hub," such that the server computer system acts as a funnel through which all messages pass. Therefore, a fewer number of proprietary connections between the "hub" and the external entities are required.

The present invention also provides an all-inclusive routing functionality that limits the amount of logic required by the "spoke" computers. In particular, various embodiments of the present invention provide protocol conversion, message payload conversion, encryption conversion, message broadcast, and/or message archival functionality, so that the "spoke" computers need not be concerned with providing such functionality on their own.

For instance, according to an embodiment of the present invention, a server computer system, which may include one or more computers, is programmed to receive a message via a protocol. The server computer system determines a destination for the message and what protocol is needed to communicate with the destination. Thereafter, the server computer system transmits the message to the destination via the protocol required by the destination. The protocols may be, without limitation, HTTP, SOAP, MQ, TCP/IP, SNA, GPRS ("General Packet Radio Service"), etc. The message may be an IBM Websphere™ MQ message, a SonicMQ™ message, and a Tibco™ EMS message, for example.

According to another embodiment of the present invention, the message has a data payload in a first format, and the server computer system determines whether the first format of the data payload is to be converted to a second format. If so, the server computer system converts the data payload from the first format to the second format, and transmits the message to the destination in the second format. The first and/or second format(s) may be, without limitation, a Microsoft Word format, a Microsoft Excel™ format, a Microsoft Powerpoint™ format, a WordPerfect™ format, a Portable Document Format ("PDF"), a text-based format, an XML or XML-based format, an ebXML format, a SWIFT format, a FIX format, an ATM format, a CHIP format, an ACH format, an EDI format, an image file format (JPEG, BMP, TIF, etc.), or a video file format (MOV, MPG, AVI, etc.).

According to a further embodiment of the present invention, the server computer system includes encryption conversion functionality. For instance, the server computer system determines whether the message is to be encrypted and what encryption process is to be used prior to transmission of the message to the destination. If the message is to be encrypted, the message is encrypted according to the pertinent encryption process. If the message was received by the server computer system in an encrypted format, the message may be decrypted prior to encrypting the message according to the pertinent encryption process and prior to transmission to the destination. Encryption processes may include, without limitation, SSL, MQ Secure, etc.

According to still another embodiment of the present invention, message-broadcast functionality is provided by the server computer system. In particular, the message identifies a plurality of destinations, and the server computer system determines the protocol(s), payload format(s), and encryption format(s) required by each of the destinations. The server computer system then performs any required protocol conversions, payload conversions, and encryption conversions prior to sending the message to its destinations.

According to yet another embodiment of the present invention, message archival functionality is provided by the server computer system. In this instance, the message may include information specifying that the message is to be archived or "persistent."

BRIEF DESCRIPTION OF THE DRAWINGS

The present invention will be more readily understood from the detailed description of preferred embodiments presented below considered in conjunction with the attached drawings, of which.

It is to be understood that the attached drawings are for purposes of illustrating the concepts of the invention and may not be to scale.

DETAILED DESCRIPTION OF THE INVENTION

Figure 1:
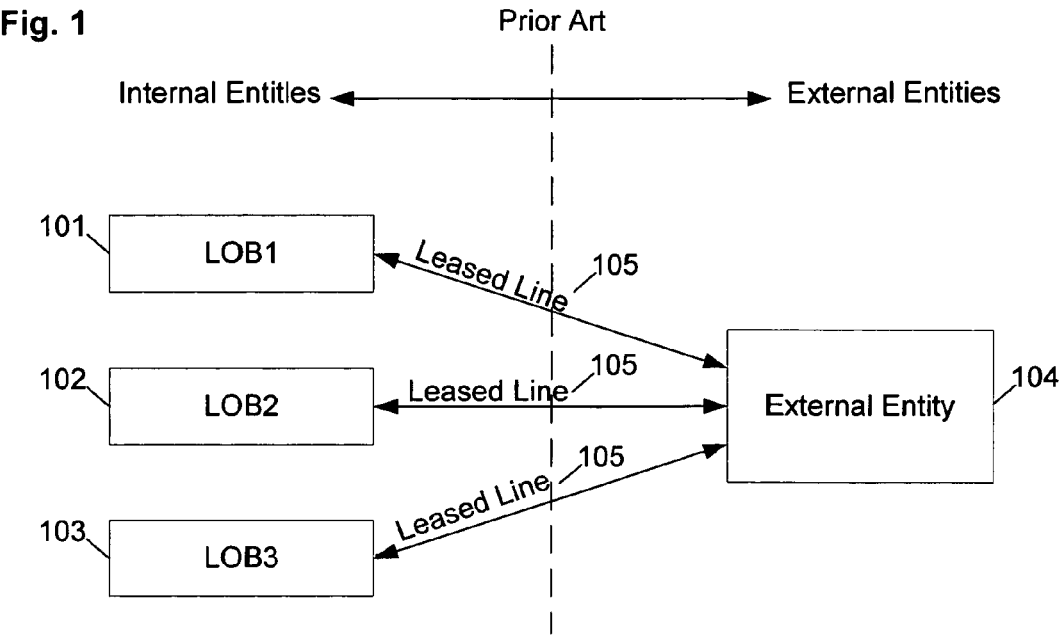
FIG. 1 illustrates a conventional communication arrangement.
Figure 2:
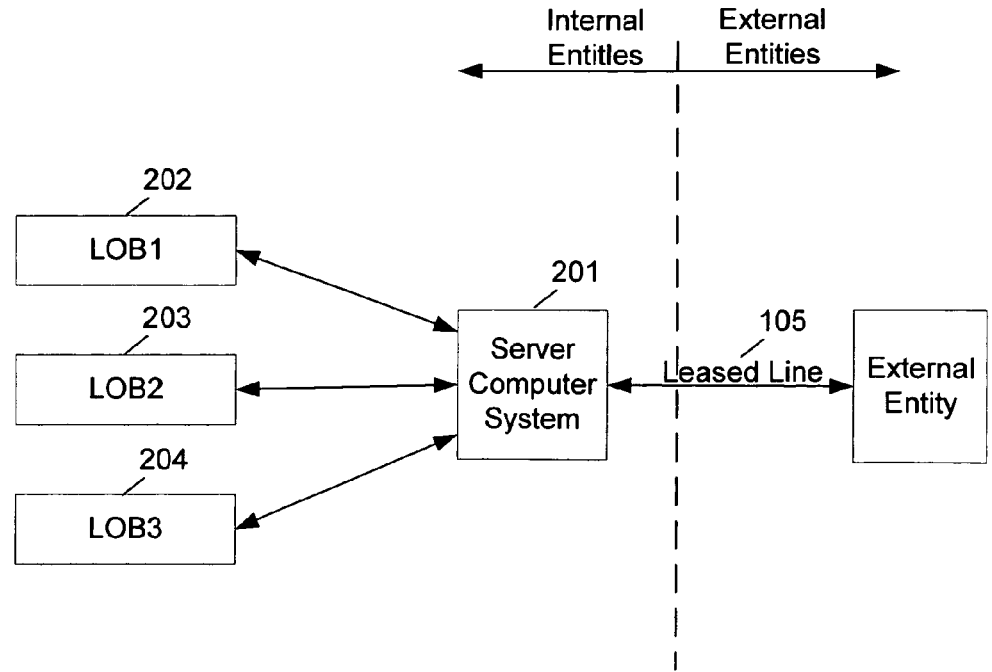
FIG. 2 illustrates a communication arrangement, according to an embodiment of the present invention.

With reference to FIG. 2, the present invention provides a hub-and-spoke communication arrangement, in which the "hub" includes a server computer system 201, which may comprise one or more server computers. The "spokes" are other computers 202, 203, 204, 205 that act as message originators and/or destinations. In the embodiment illustrated in FIG. 2, computers 202, 203, 204 are computers that belong to internal lines of business "LOB1," "LOB2," and "LOB3," respectively. Also in the embodiment of FIG. 2, the computer 205 belongs to an external entity. All internal-to-external messages, and vice versa, are routed through the "hub," or server computer system 201. In other words, the server computer system 201 acts as a funnel through which all messages pass. Therefore, a fewer number of proprietary connections 105 between the "hub" and the external entity/ies are required. As shown in FIG. 2, as few as a single proprietary connection 105 may be used by the lines of business 202, 203, 204.

In addition to reducing the number of proprietary connections 105 needed, the present invention also provides an all-inclusive routing functionality that limits the amount of logic required by the "spoke" computers. In particular, various embodiments of the present invention provide protocol conversion, message payload conversion, encryption conversion, message broadcast, and/or message archival functionality, so that the "spoke" computers need not be concerned with providing such functionality on their own.

Figure 3:
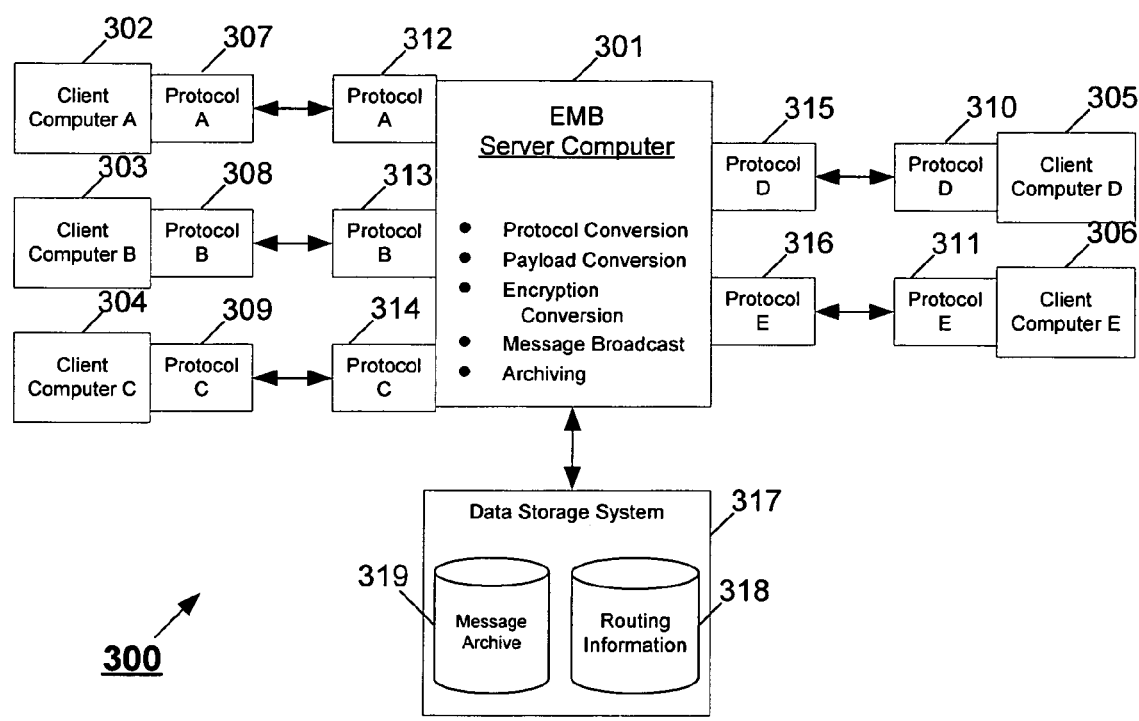
FIG. 3 illustrates a system for routing messages, according to an embodiment of the present invention.

FIG. 3 illustrates a system 300 for routing messages, according to an embodiment of the present invention. An Enterprise Messaging Bus ("EMB") server computer 301 is an implementation of the server computer system 201 illustrated in FIG. 2, according to an aspect of the present embodiment. The EMB server computer 301 routes messages to a plurality of client computers communicatively connected to the EMB server computer 301: a "client computer A" 302, a "client computer B" 303, a "client computer C" 304, a "client computer D" 305, and a "client computer E" 306. Although only client computers are shown in FIG. 3, one skilled in the art will appreciate that server computers may be included as message originators and/or message destinations from the perspective of the EMB server computer 301. Further, although only five client computers 302 to 306 are shown in FIG. 3, one skilled in the art will appreciate that any number of client computers may be used. The client computers 302 to 306 may belong to internal or external entities. The messages transmitted between the client computers 302 to 306 may be, without limitation, IBM Websphere MQ messages, SonicMQ messages, and Tibco EMS messages, for example. One skilled in the art will appreciate, however, that the present invention is not limited to particular message types. In the case where MQ messages are transmitted, the EMB server computer 301 may operate an MQ server application so that the individual client computers 302 to 306 do not have to operate their own MQ server applications, thereby simplifying processing for the client computers 302 to 306 and reducing their costs.

The term "computer" is intended to include any data processing device, such as a desktop computer, a laptop computer, a mainframe computer, a personal digital assistant, a Blackberry, and/or any other device for processing data, whether implemented with electrical and/or magnetic and/or optical and/or biological components, or otherwise.

In the embodiment of FIG. 3, each client computer 302 to 306 communicates with the EMB server computer 301 using its own preferred protocol. For example, client computer A 302 communicates using protocol A 307, client computer B 303 communicates using protocol B 308, client computer C 304 communicates using protocol C 309, client computer D 305 communicates using protocol D 310, and client computer E 306 communicates using protocol E 311. Although each client computer 302 to 306 is shown as communicating using a different protocol, some or all of the client computers 302 to 306 may communicate using the same protocol. The protocols may be, without limitation, HTTP, SOAP, MQ, TCP/IP, SNA, GPRS ("General Packet Radio Service"), etc. One skilled in the art will appreciate, however, that the present invention is not limited to any particular protocol.

The EMB server computer 301 communicates using any of the protocols required by the client computers 302 to 306. For example, because the client computer A 302 communicates using protocol A 307, the EMB server computer 301 communicate with the client computer A 302 using protocol A 312, the same protocol as protocol A 307. Correspondingly, the EMB server computer 301 communicates with the client computer B 303 using protocol B 313 to match protocol B 308. Similarly, the EMB server computer 301 communicates with the client computer C 304 using protocol C 314, with the client computer D 305 using protocol D 315, and with the client computer E 306 using protocol E 316.

To facilitate the routing of messages between the client computers 302 to 306, the EMB server computer 301 manages and references data stored in a data storage system 317, which is communicatively connected to the EMB server computer 301. The phrase "communicatively connected" is intended to include any type of connection, whether wired, wireless, or both, between devices and/or programs in which data may be communicated. Further, the phrase "communicatively connected" is intended to include a connection between devices and/or programs within a single computer, a connection between devices and/or programs located in different computers, or a connection between devices not located in computers at all. In this regard, although the data storage system 317 is shown separately from the ENB server computer 301, one skilled in the art will appreciate that the data storage system 317 may be stored completely or partially within the EMB server computer 301.

The data storage system 317 stores, among other things, routing information 318. The routing information 318 includes information specifying the protocol(s) used by each of the client computers 302 to 306. When the EMB server computer 301 receives a message, it accesses the routing information 318 to determine what protocol to use to send the message to the message's destination. Such determination is referred to herein as "protocol conversion," whereby the EMB server computer 301 receives a message according to a first protocol, determines a second protocol used by a destination computer using the routing information 318, and transmits the message to the destination computer using the second protocol. By storing the routing information 318 in the data storage system 317, the client computers 302 to 306 do not have to be concerned with what protocols are used by the other client computers.

In addition to performing protocol conversions, the EMB server computer 301 is configured to perform message payload conversions, according to an embodiment of the present invention. A message, according to an aspect of the present embodiment, has administrative information, such as destination information, and a payload, which is the actual substantive data to be transmitted. For example, if a portable document format ("PDF") file, which is known in the art, is to be transmitted to the client computer E 306, the message's administrative information specifies that the client computer E 306 is the destination, and the payload is the PDF file.

The administrative information in the message also may specify that the payload is to be converted from one format to another prior to being sent to the destination. For example, a message transmitting a Microsoft Word document to the client computer E 306, may specify in its administrative information that the Word document is to be converted to the PDF format prior to being transmitted to the client computer E 306. In this scenario, the EMB server computer 301, upon reading the administrative information included in the message, performs payload conversion on the message's payload by converting the Word document to a document in the PDF format prior to transmitting the message to the client computer E 306. Payload conversions may also include, without limitation, a Microsoft Word format, a Microsoft Excel format, a Microsoft Powerpoint format, a WordPerfect format, a Portable Document Format ("PDF") format, a text-based format, an XML or XML-based format, an ebXML format, a SWIFT format, a FIX format, an ATM format, a CHIP format, an ACH format, an EDI format, an image file format (JPEG, BMP, TIF, etc.), or a video file format (MOV, MPG, AVI, etc.). One skilled in the art will appreciate, however, that payload conversions involving other formats are included within the scope of the invention.

According to an embodiment of the present invention, the routing information 318 includes payload conversion information in addition to or in lieu of the administrative information in the messages. In particular, the routing information 318 may specify a default payload conversion format for one or more of the client computers 302 to 306. For example, the routing information may specify that, by default, any message with a payload having a Microsoft Word format going to the client computer E 306 is to be converted to the PDF format. If, at the same time, the administrative information in an incoming message specifies that the payload is not to be converted or is to be converted to a format other than the PDF format, the EMB server computer 301 adheres to the instructions in the administrative information in the message over the default instructions in the routing information 318.

According to an embodiment of the present invention, the EMB server computer 301 is configured to perform encryption conversions. The phrase "encryption conversion" is intended to include the process of encrypting an unencrypted message, decrypting an encrypted message, and/or decrypting an encrypted message and encrypting the decrypted message using the same or a different encryption technique. The routing information 318 may specify whether messages are to be encrypted, what types of messages require encryption, and what encryption technique(s) is/are to be used when sending messages to particular client computers. For example, the routing information 318 may specify that all messages transmitted to the client computer E 306 are to be encrypted using MQ Secure, which is known in the art. Another example is that the routing information 318 may specify that only messages transmitted to the client computer D 305 originating from the client computer C are to be encrypted using Secure Socket Layer ("SSL") encryption. Yet another example is that the routing information 318 may specify that all messages beginning with the word "confidential," when transmitted to the client computer C 304, are to be encrypted using SSL encryption. When the EMB server computer 301 receives a message, it accesses the routing information 318 to determine whether and how to encrypt the message before transmitting the message to its destination(s).

By performing message encryption with the EMB server computer 301, only the EMB server computer 301 needs to operate software and storage capacity required to perform such encryptions. To elaborate, the EMB server computer 301 is configured to store a repository of encryption software that is available for all of the client computers 302 to 306 to use without those computers having to store their own repositories of encryption software. This arrangement reduces the amount of software and storage capacity required by the client computers 302 to 306 and, consequently, reduces costs and may reduce licensing fees associated with such encryption software. For example, if the client computer A 302 requires that all messages transmitted to it be encrypted according to a proprietary encryption technique, only the EMB server 301 needs to use the proprietary encryption technique. If the client computer E 306 wants to send a message to the client computer A 302, the client computer E 306 transmits the message to the EMB server computer 301 using a no-cost encryption technique (or without any encryption). Upon receipt, the EMB server computer 301 decrypts the message using the no-cost encryption technique, if necessary, and then encrypts the message using the proprietary encryption technique before forwarding the message to the client computer A 302. That is, only a single copy of the software for the proprietary encryption technique is required.

According to an embodiment of the present invention, the administrative information in a message may specify that the message is to be a broadcast message. A broadcast, or multi-cast, message is a message that is sent to a plurality of client computers without having to specifically identify every destination computer. The routing information 318 may include information specifying groups of client computers, and the administrative information in the message need only specify a group name to send the message to the client computers in the group. For example, the EMB server computer 301 may receive a message specifying that the destination of the message is "all users." In such a circumstance, the EMB server computer 301 accesses the routing information 318 to determine the addresses of all of the client computers 302-306, and transmits the message to all client computers, with the exception of the originating client computer, if desired.

According to an embodiment of the present invention, the EMB server computer 301 performs message archiving. To implement such functionality, the EMB server computer searches for an indication in the administrative information in an incoming message that the message is to be archived. According to an aspect of this embodiment, the administrative information indicates that the message is to be a persistent message. Upon receipt of a message including such an indication, the EMB server computer 301 stores the message in a message archive 319 within the data storage system 317. An advantage of this arrangement is that a client computer may instruct the EMB server computer 301 to resend an archived message to the same or a different destination without having to retransmit the message to the EMB server computer 301.

According to another embodiment of the present invention, the EMB Server 301 is configured to compile messaging statistics used for billing, resource planning, marketing, and/or general reporting purposes, according to the system and method described in U.S. patent application Ser. No. 11/113,752, titled "System and Method for Measuring Communication-System Infrastructure Usage," by Vincent Sethi, Philip J. DiStefano, and Thomas J. Connelly, filed concurrently herewith, which application is hereby incorporated herein by reference.

Figure 4:
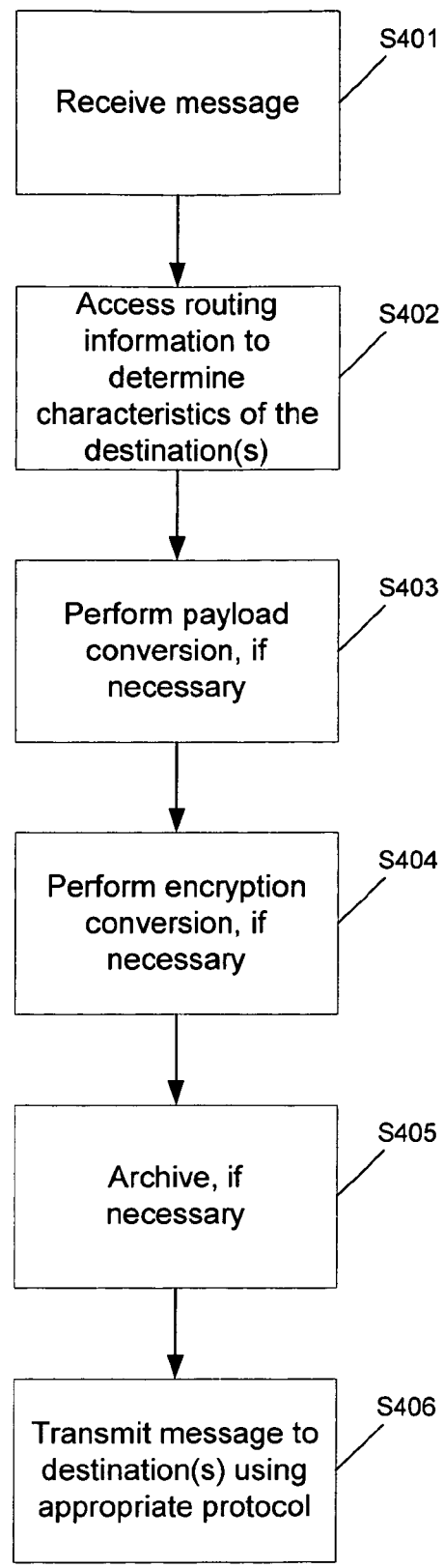
FIG. 4 illustrates a method for routing messages, according to an embodiment of the present invention.
Figure 5:
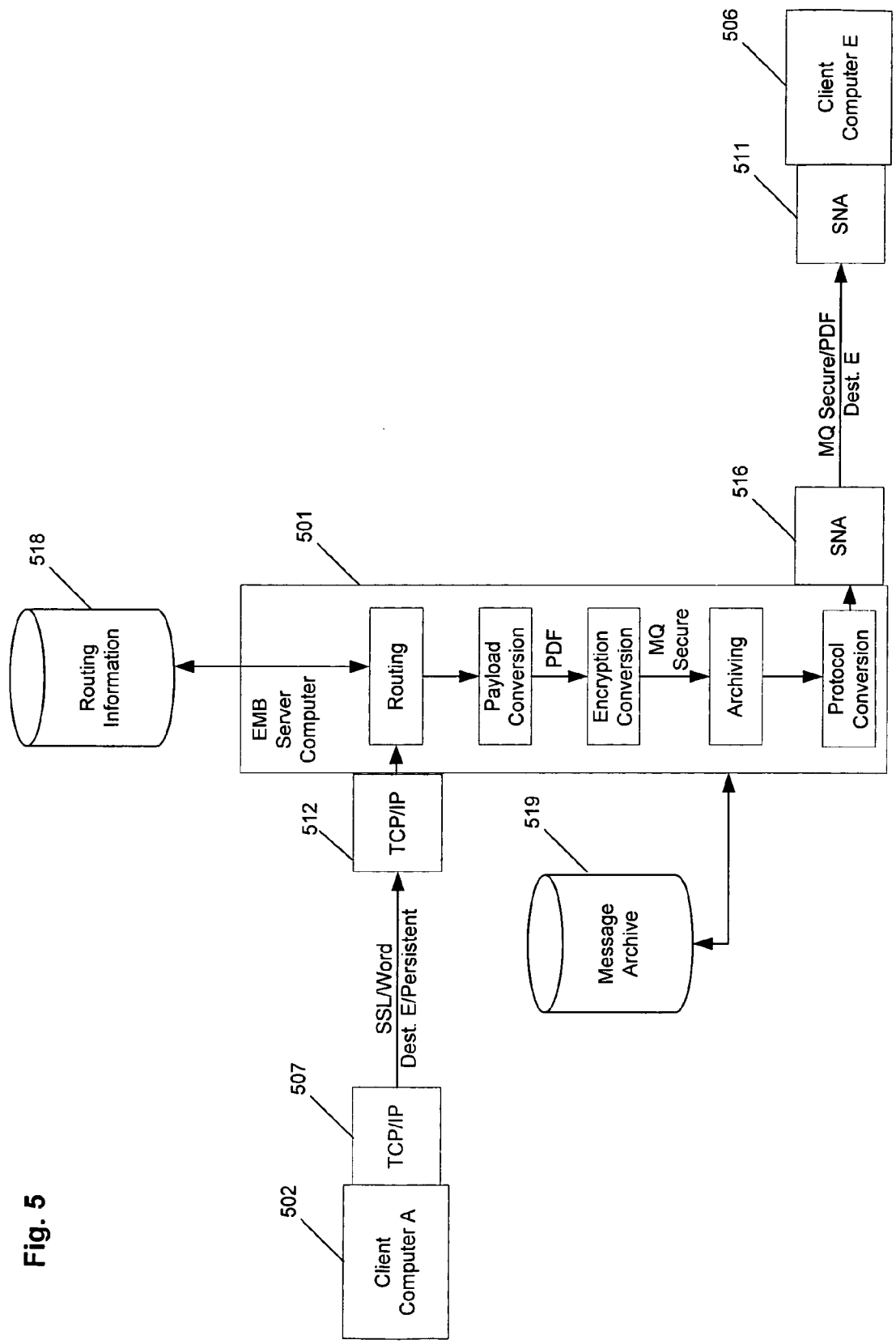
FIG. 5 illustrates an example of a message being routed through a system, according to an embodiment of the present invention.

FIG. 4 illustrates a method for routing messages, according to an embodiment of the present invention. FIG. 4 will be described in conjunction with FIG. 5, which illustrates an example of a message routed through a system, according to an embodiment of the present invention. At step S401, the EMB server computer 501 receives a message for distribution. For example, the message may be received from the client computer A 502 via the TCP/IP protocol 507, 512. Optionally, the message may be encrypted according to SSL encryption. The message's administrative information may specify that the message originates from the client computer A 502, that the message is to be persistent, and that the destination for the message is the client computer E 506. The message's payload may be in Word format, which also may be specified by the message's administrative information. The message's administrative information may further specify that the payload format is to be converted into the PDF format. In summary, the message's administrative information may specify the information shown in Table I. Note that the information shown in Table I is used for illustration purposes only. One skilled in the art will appreciate that the message's administrative information may include less information, different types of information, and/or may specify information in different formats.

TABLE I

Message's Administrative Information

| Message Originator | Destination(s) | Current Payload Format | Desired Payload Format | Persistent? |
|---|---|---|---|---|
| Client Computer A 502 | Client Computer E 506 | Word | PDF | Yes |

At step S402, the EMB server computer 501 accesses the routing information 518 to determine the characteristics of the destination computer(s). In this example, the routing information 518 may include the information shown in Table II.

TABLE II

Subset of Routing Information 518

| Destination | Protocol | Encryption Technique (if any) |
|---|---|---|
| Client Computer A 502 | SNA | MQ Secure |

The information shown in Table II is used for illustration purposes only. One skilled in the art will appreciate that the routing information 518 may include different types of information and/or may specify information in different formats for each destination computer. For example, the routing information 518 may further include a preferred message payload format, which may be overridden based upon a format specified in a message's administrative information. Also, the routing information 518 may specify different encryption techniques depending upon characteristics of the message, such as the type of message payload, the name of the message, and/or the originator of the message. Further, the routing information 518 may specify different preferred payload formats depending upon characteristics of the message. Further still, the routing information 518 may specify that particular payload formats are not acceptable and that such messages are to be rejected.

At step S403, the EMB server computer 501 converts the message's payload format, if necessary, based upon the message's administrative information. In this example, the message's administrative information in Table I specifies that the message's payload is currently in Word format and that the message's payload is to be converted to the PDF format. Accordingly, the EMB server computer 301 converts the message's payload format from Word format to the PDF format, at step S403.

At step S404, the EMB server computer 501 decrypts and/or encrypts the message, if necessary, based upon the received routing information 518. In this example, the routing information 518 shown in Table II specifies that messages transmitted to the client computer E 506 are to be encrypted according to the MQ Secure encryption program. Accordingly, the EMB server computer 301 runs the MQ Secure encryption program to encrypt the message at step S404.

At step S405, the EMB server computer 501 archives the message, if necessary, based upon the message's administrative information. In this example, the message's administrative information in Table I specifies that the message is to be persistent. Accordingly, the EMB server computer 501 stores the message in the message archive 519, at step S405.

At step S406, the ENB server computer 501 transmits the message using the protocol required by the destination(s), as specified by the routing information 518. In this example, the routing information in Table II indicates that the client computer E 506 uses the SNA protocol, which is known in the art. Accordingly, the EMB server computer 501 transmits the message using the SNA protocol 511, 516 to the client computer E 506, at step S406.

Although FIG. 4 illustrates a particular sequence of steps, one skilled in the art will appreciate that the invention is not limited to this particular sequence of steps and that the steps in FIG. 4 may occur in a different order. For example, the archiving step S405 may occur any time after receipt of the message at step S401. Further, the payload conversion step S403 may occur prior to accessing the routing information 518 at step S402. In addition, the present invention is not limited to the occurrence of all of the steps shown in FIG. 4. In particular, steps S403, S404, and S405 are optional.

Figure 6:
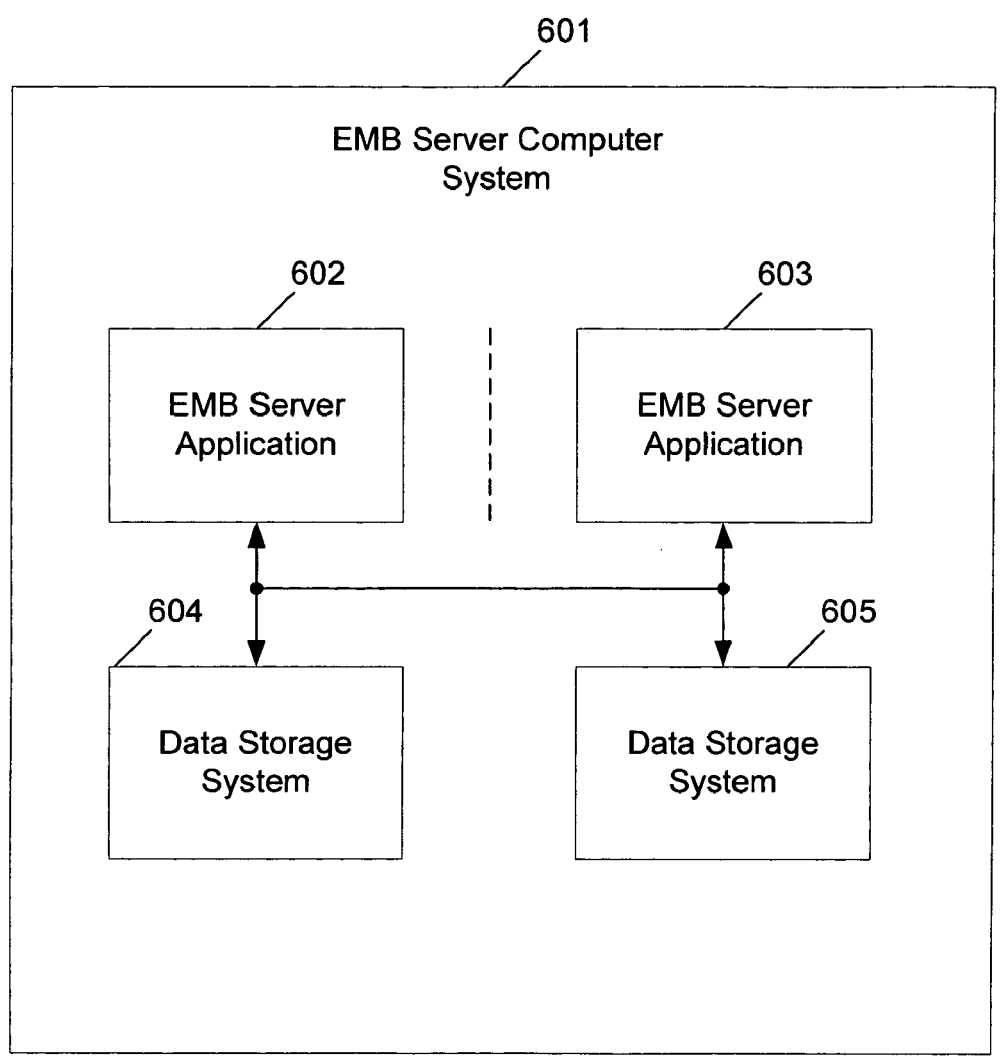
FIG. 6 illustrates a system for routing messages, according to an embodiment of the present invention, according to an embodiment of the present invention.

FIG. 6 illustrates an EMB server computer system 601, according to an embodiment of the present invention. The EMB server computer system 601 includes redundancy with respect to EMB server applications 602, 603. The EMB server applications 602, 603 are similar, if not identical, applications that control the EMB server computer system 601 to behave as described above with reference to the server computer system 201, the EMB server computer 301, and/or the EMB server computer 501. The EMB server applications 602, 603 each may be located on one or more computers. The EMB server application 602 may be designated as a primary application that controls the EMB server computer system 601 until it fails. If the EMB server application 602 fails, the EMB server application 603 takes over controlling the EMB server computer system 601.

The EMB server computer system 601 also includes redundancy provided with synchronous mirroring, which is known in the art, with respect to data storage systems 604, 605. One skilled in the art, however, will appreciate that redundancy may be provided with solutions other than synchronous mirroring. The data storage systems 604, 605 are similar, if not identical, data storage systems storing the data described with respect to the data storage system 317. The data storage systems 604, 605 are preferably stored at different locations. The data storage system 604 may be designated as a primary data storage system that provides data to the EMB server application 602 or the EMB server application 603, whichever is currently controlling the functionality of the EMB server computer system 601. If the data storage system 604 fails, the data storage system 605 takes over. Although only two identical EMB server applications 602, 603 and only two identical data storage systems 604, 605 are shown in FIG. 6, one skilled in the art will appreciate that more EMB server applications 602, 603 and/or data storage systems 604, 605 may be provided.

It is to be understood that the exemplary embodiments are merely illustrative of the present invention and that many variations of the above-described embodiments can be devised by one skilled in the art without departing from the scope of the invention. It is therefore intended that all such variations be included within the scope of the following claims and their equivalents.

What is claimed is:

1. A computer-implemented method for routing messages, comprising the steps of:
receiving a message, encrypted according to a first encryption process, via a first protocol, the message having a data payload in a first format;
determining a destination for the message;
determining a second protocol for the destination;
determining whether the first format of the data payload is to be converted to a second format;
converting the data payload from the first format to the second format, if it is determined that the first format of the data payload is to be converted to the second format; and
transmitting the message to the destination via the second protocol
wherein the message is transmitted in the first format if the data payload was not converted from the first format to the second format, and
wherein the message is transmitted in the second format to the destination, if the data payload was converted from the first format to the second format;
determining whether the message is to be encrypted prior to being transmitted to the destination;
decrypting the message, if it is determined that the message is not to be encrypted prior to being transmitted to the destination, wherein the decrypted message is transmitted to the destination;
determining whether the message is to be encrypted according to a second encryption process prior to being transmitted to the destination, if it is determined that the message is to be encrypted prior to being transmitted to the destination; and
decrypting the message and encrypting the message according to the second encryption process, if it is determined that the message is to be encrypted according to the second encryption process prior to being transmitted to the destination,
wherein the message encrypted according to the second encryption process is transmitted to the destination.

2. The method of claim 1, further comprising the steps of:
determining whether the message is to be archived; and
archiving the message, if it is determined that the message is to be archived.

3. The method of claim 1, wherein the first protocol and the second protocol are a same protocol.

4. The method of claim 1, wherein the destination is an intermediate destination.

5. The method of claim 1, wherein the first format or the second format or both the first format and the second format are a Microsoft Word format, a Microsoft Excel.™. format, a Microsoft Powerpoint.™. format, a WordPerfect.™. format, a Portable Document Format ("PDF") format, a text-based format, an XML-based format, an ebXML format, a SWIFT format, a FIX format, an ATM format, a CHIP format, an ACH format, an EDI format, an image file format, or a video file format.

6. A computer-accessible memory storing computer code for implementing a method for routing messages, wherein the computer code comprises:
code for receiving a message, encrypted according to a first encryption process, via a first protocol, the message having a data payload in a first format;
code for determining a destination for the message;
code for determining a second protocol for the destination;
code for determining whether the first format of the data payload is to be converted to a second format;
code for converting the data payload from the first format to the second format, if determined that the first format of the data payload is to be converted to the second format; and
code for transmitting the message to the destination via the second protocol, wherein the message is transmitted in the first format if the data payload was not converted from the first format to the second format, and
wherein the message is transmitted in the second format to the destination if the data payload was converted from the first format to the second format;
code for determining whether the message is to be encrypted prior to being transmitted to the destination;
code for decrypting the message, if it is determined that the message is not to be encrypted prior to being transmitted to the destination, wherein the decrypted message is transmitted to the destination;
code for determining whether the message is to be encrypted according to a second encryption process prior to being transmitted to the destination, if it is determined that the message is to be encrypted prior to being transmitted to the destination; and code for decrypting the message and encrypting the message according to the second encryption process, if it is determined that the message is to be encrypted according to the second encryption process prior to being transmitted to the destination, wherein the message encrypted according to the second encryption process is transmitted to the destination.

7. The computer-accessible memory of claim 6, wherein the computer code further comprises:

code for determining whether the message is to be archived; and code for archiving the message, if it is determined that the message is to be archived.

8. The computer-accessible memory of claim 6, wherein the first format or the second format or both the first format and the second format are a Microsoft Word format, a Microsoft Excel.™. format, a Microsoft Powerpoint.™. format, a WordPerfect.™. format, a Portable Document Format ("PDF") format, a text-based format, an XML-based format, an ebXML format, a SWIFT format, a FIX format, an ATM format, a CHIP format, an ACH format, an EDI format, an image file format, or a video file format.

9. A system for routing messages, the system comprising:

a first client computer configured to execute a client messaging program that instructs the first client computer to transmit a message via a first protocol;

a second client computer; and a server computer communicatively connected to the first client computer and the second client computer, wherein the server computer is configured to execute a server messaging program that instructs the server computer to at least:

receive the message from the first client computer via the first protocol, wherein the message includes information that specifies the second client computer as a destination for the message;

determine a second protocol for the second client computer; and transmit the message to the second client computer via the second protocol;

wherein the first client computer is programmed at least to encrypt the message according to a free-of-charge encryption process prior to transmission, and the server messaging program further instructs the server computer to at least:

decrypt the message according to the free-of-charge encryption process; and encrypt the message according to a proprietary encryption process, wherein the message encrypted according to the proprietary encryption process is transmitted to the second client computer via the second protocol.

10. The system of claim 9, further comprising a data storage system communicatively connected to the server computer, wherein the server computer determines the second protocol based at least upon information stored in the data storage system.

11. The system of claim 9, wherein the client messaging program is an MQ client program, the server messaging program is an MQ server program, and the message is an MQ message.

12. The system of claim 9, further comprising a data storage system, communicatively connected to the server computer, wherein the server computer further is programmed to determine the proprietary encryption process based at least upon information stored in the data storage system.

13. The system of claim 9, wherein the free-of-charge encryption process performs Secure Socket Layer ("SSL") encryption.

14. The system of claim 9, wherein the proprietary encryption process performs MQ Secure encryption.

15. A computer-based method for routing messages, comprising the steps of:

receiving an MQ message, encrypted according to a first encryption process, via a first protocol, wherein the message has a data payload in a first format; determining a destination for the message;

determining a second protocol for the destination;

determining whether the first format of the data payload is to be converted to a second format;

converting the data payload from the first format to the second format, if it is determined that the first format of the data payload is to be converted to the second format, wherein the first format or the second format or both the first format and the second format are a Microsoft Word format, a Microsoft Excel.™. format, a Microsoft Powerpoint.™. format, a WordPerfect.™. format, a Portable Document Format ("PDF") format, a text-based format, an XML-based format, an ebXML format, a SWIFT format, a FIX format, an ATM format, a CHIP format, an ACH format, an EDI format, an image file format, or a video file format;

determining whether the message is to be encrypted prior to being transmitted to the destination;

decrypting the message, if it is determined that the message is not to be encrypted prior to being transmitted to the destination, wherein the decrypted message is transmitted to the destination;

determining whether the message is to be encrypted according to a second encryption process prior to being transmitted to the destination, if it is determined that the message is to be encrypted prior to being transmitted to the destination;

encrypting the message and encrypting the message according to the second encryption process, if it is determined that the message is to be encrypted according to the second encryption process prior to being transmitted to the destination;

determining whether the message is to be archived by reading the message for an indication that the message is to be persistent; archiving the message, if it is determined that the message is to be archived; and transmitting the message, encrypted according to the second encryption process, to the destination via the second protocol, wherein the message is transmitted in the first format if the data payload was not converted from the first format to the second format, and wherein the message is transmitted in the second format to the destination if the data payload was converted from the first format to the second format.

* * * * *